United States Patent Office.

WILLIAM ZINSSER, OF NEW YORK, N. Y.

Letters Patent No. 109,990, dated December 6, 1870.

---

IMPROVEMENT IN COMPOUNDS FOR TREATING MALT LIQUORS.

---

The Schedule referred to in these Letters Patent and making part of the same.

---

To all whom it may concern:

Be it known that I, WILLIAM ZINSSER, of the city, county, and State of New York, have invented a new and improved Compound for Treating Malt Liquors; and I do hereby declare the following to be a full, clear, and exact description thereof, which will enable those skilled in the art to make and use the same.

This invention relates to a compound made of bi-carbonate of soda or potash, an organic acid such as tartaric acid, and a glutinous substance such as gum-arabic, gum-gedda, or gum-senegal, with or without sugar, mixed together and applied to beer or other fermented malt liquors in such a manner that, by the bicarbonate of soda or potash, any acid contained in the liquor is neutralized, and, at the same time, the carbonic acid evolved from said bicarbonate increases the effervescence of the liquor and keeps the gum in solution, said gum serving to give substance to the foam.

In preparing my compound, I take bicarbonate of soda or potash, eight parts; tartaric acid, two parts; gum-arabic, two parts; to which may be added sugar, one part.

The proportions above given may, however, be changed, according to the purity of the materials and according to the liquid to be treated.

These ingredients are ground together, so that they become intimately mixed, and that a fine powder is obtained which is innoxious to the consumer of the malt liquor.

In place of gum-arabic I can also use gum-gedda or gum-senegal, or any other glutinous material innoxious to the consumer.

Sugar may be used with my compound, to counteract the bitter taste of the same.

By mixing my compound with beer or other malt liquors the acid contained in the beer is neutralized, the effervescence of the beer is increased, and the foam formed on the surface of the beer, as the same is poured in a tumbler or drawn from a barrel, is rendered stiff and durable by the gum which is held in solution by the acid evolved from the bicarbonate of soda or potash.

Furthermore, beer or other malt liquors, when mixed with my compound, become perfectly clear, and they are healthy and agreeable to drink.

What I claim as new, and desire to secure by Letters Patent, is—

A compound for treating malt liquors, made of the ingredients herein specified, and mixed together substantially in the manner set forth.

WM. ZINSSER.

Witnesses:
 W. HAUFF,
 C. WAHLERS.